(12) United States Patent
Wang

(10) Patent No.: US 9,695,809 B1
(45) Date of Patent: Jul. 4, 2017

(54) AIR PUMP CAPABLE OF TWIST-LOCKING ENGAGEMENT

(71) Applicant: BETO ENGINEERING AND MARKETING CO., LTD., Taichung (TW)

(72) Inventor: Lopin Wang, Taichung (TW)

(73) Assignee: Beto Engineering and Marketing Co., Ltd., Taichung (TW)

( * ) Notice: Subject to any disclaimer, the term of this patent is extended or adjusted under 35 U.S.C. 154(b) by 0 days.

(21) Appl. No.: 15/013,487

(22) Filed: Feb. 2, 2016

(30) Foreign Application Priority Data

Dec. 25, 2015 (TW) .............................. 104220865 U

(51) Int. Cl.
*F16K 15/20* (2006.01)
*F04B 33/00* (2006.01)

(52) U.S. Cl.
CPC ............ *F04B 33/005* (2013.01); *F16K 15/20* (2013.01); *Y10T 137/3724* (2015.04)

(58) Field of Classification Search
CPC .......... B60S 5/04; F04B 33/005; F04B 39/08; F04B 39/10; F04B 39/1013; Y10T 137/3724; Y10T 137/3584; F16K 31/602; F16K 11/04
USPC ................................. 137/223, 231; 251/149.9
See application file for complete search history.

(56) References Cited

U.S. PATENT DOCUMENTS

| 5,379,796 | A | | 1/1995 | Wang | |
|---|---|---|---|---|---|
| 5,762,095 | A | * | 6/1998 | Gapinski | B60S 5/04 137/223 |
| 5,960,815 | A | * | 10/1999 | Wang | F04B 33/005 137/118.03 |
| 6,027,316 | A | * | 2/2000 | Wang | F04B 25/02 137/538 |
| 8,936,446 | B2 | * | 1/2015 | Wang | F04B 33/00 417/437 |
| 9,057,364 | B2 | * | 6/2015 | Gerritsen | F04B 33/005 |
| RE46,053 | E | * | 7/2016 | Wu | F04B 33/00 |
| 9,388,914 | B2 | * | 7/2016 | Wang | F04B 33/005 |
| 2010/0290931 | A1 | * | 11/2010 | Sanders | F04B 33/00 417/374 |

* cited by examiner

*Primary Examiner* — Craig J Price
(74) *Attorney, Agent, or Firm* — Muncy, Geissler, Olds & Lowe, P.C.

(57) ABSTRACT

An air pump capable of twist-locking engagement includes a body housing, a head housing, a leakproof ring, an elastic sleeve, a pushing member and an end cap. The body housing has a cam section formed as a tube having a quarter-round section. The head housing has an opening segment. The head housing and the body housing are rotatably coupled with the leakproof ring arranged therebetween. The elastic sleeve is located at the opening segment of the head housing. The pushing member is located at one end of the elastic sleeve and received in the cam section. The end cap is screwed to the opening segment for pressing against and positioning the elastic sleeve. By a twisting operation of the air pump, the cam section can be turned to engage or release an air valve of an article to be inflated.

6 Claims, 7 Drawing Sheets

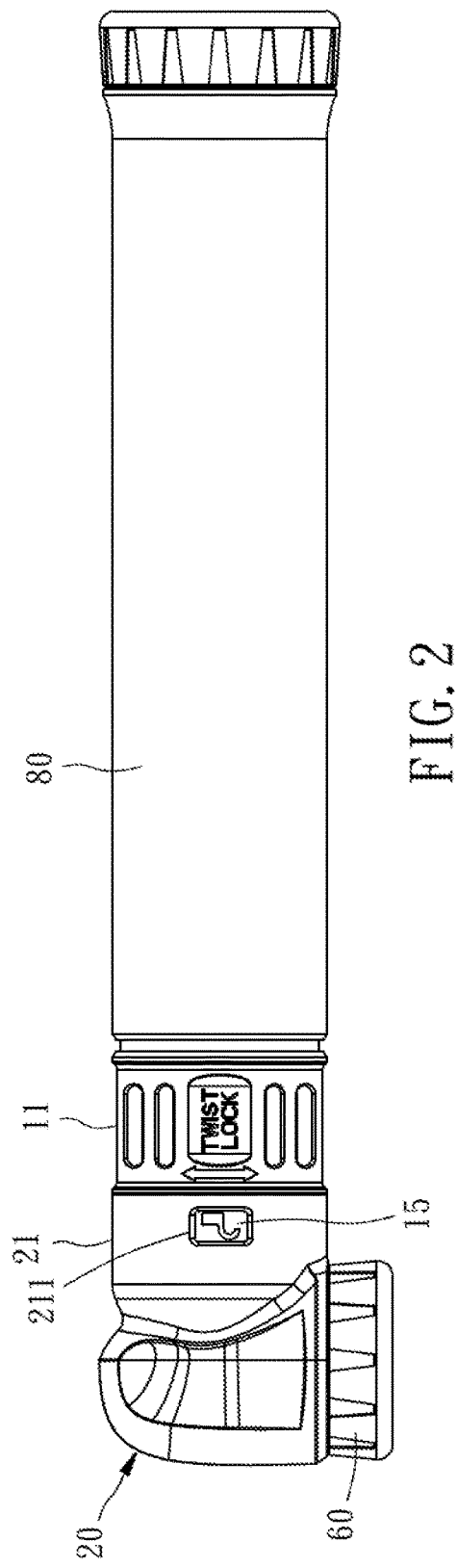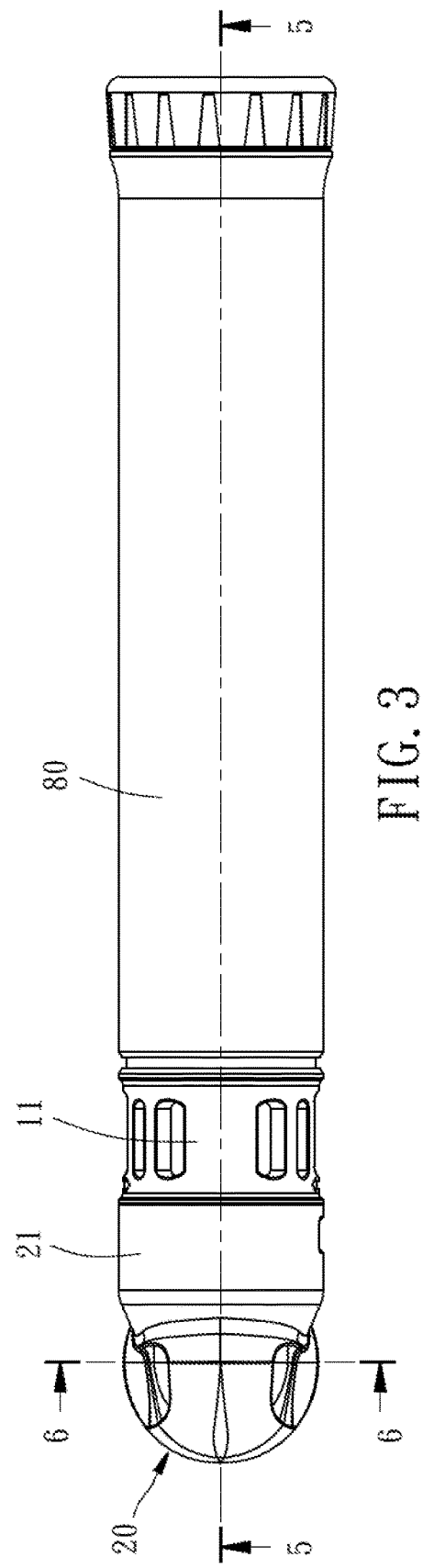

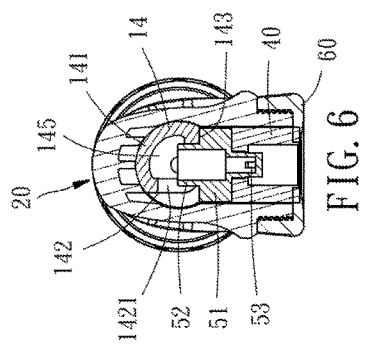
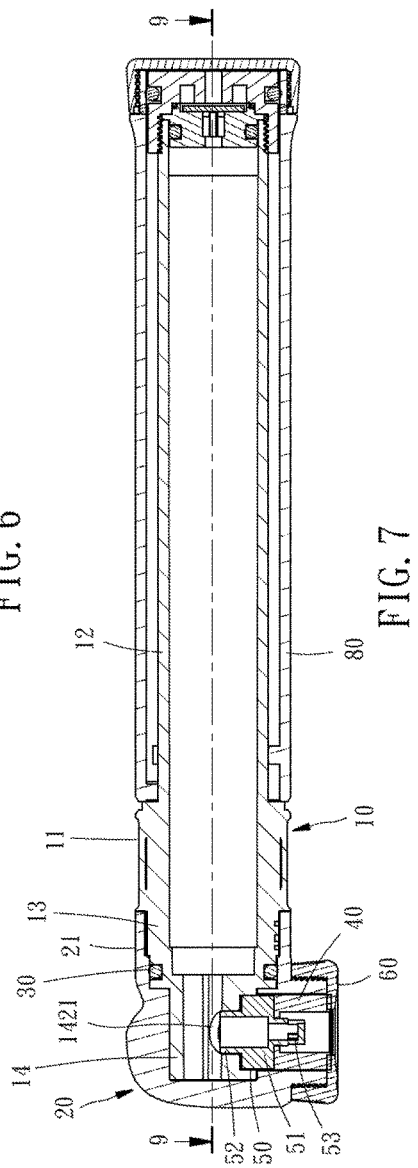
FIG. 6
FIG. 7

AIR PUMP CAPABLE OF TWIST-LOCKING ENGAGEMENT

BACKGROUND OF THE INVENTION

1. Technical Field

The present invention relates to air pump, and more particularly to an air pump that is capable of engaging an air valve of an article to be inflated in a twist-locking manner.

2. Description of Related Art

The air pump disclosed in U.S. Pat. No. 5,379,796, also issued as Taiwan Patent No. 93676, is one of the inventions made by the inventor of the present invention, and is designed for engaging a tire air valve in a twist-locking manner. The prior-art device uses a cam (22) to press and deform an elastic body (25) that in turn engages firm with the tire air valve. The rotating member (22), i.e. the cam is located by a screw-like locating member (23) screwed thereonto from the exterior of a head housing (21). The fact that leakproof rings (24) have to be provided at both sides of the cam (22) makes the device structurally complicated and leads to time-consuming assembling work. In view of the increase of labor costs, this forms a defect needs to be remedied. In addition, it is hard for an operator through his/her hand feeling to determine whether the cam (22) is correctly located with the cam (22) pressing against the pressing member (27) directly. Moreover, the cam (22) pressing against the pressing member (27) may sometimes undesirably block the through hole (271) of the pressing member (27) and limit the flow.

BRIEF SUMMARY OF THE INVENTION

The primary objective of the present invention is to address the disadvantages of the prior art by providing an air pump capable of twist-locking engagement, which features simplified structure and improved operational feeling.

For achieving the foregoing objective, the air pump of the present invention comprises: a body housing having a grip portion, the grip portion having one end thereof connected to a barrel of the air pump and having an opposite end thereof provided with a diametrically-reduced, cylindrical coupling portion, a diametrically-reduced cam section being extended outward from an outer end of the coupling portion, the cam section having a curved wall bent at a right angle and two substantially flat end walls, the two end walls being perpendicularly connected to each other at one side and having their opposite side connected to two sides of the curved wall, respectively, so as to form the cam section as a tube having a quarter round section, the cam section having a channel therein communicated with the coupling portion, the two end walls having different distances from a central axis of the curved wall, wherein the one farther from the central axis is the first end wall and has a slot-like first notch, while the one closer to the central axis is the second end wall and has a slot-like second notch, the first notch and the second notch being communicated with each other; a head housing having a tubular coupling portion, the coupling portion having one end extended outward to form a head segment, the head segment further extending to form an opening segment, the opening segment and the coupling portion being perpendicularly connected, the head housing being at its coupling portion coupled to the coupling portion of the body housing so that the head housing and the body housing are rotatable with respect to each other; a round leakproof ring being mounted around the coupling portion of the body housing for forming airtight connection between the head housing and the body housing; an elastic sleeve being provided at the opening segment of the head housing; a pushing member having a shoulder portion, the shoulder portion having one end thereof extended outward to form a tubular connecting portion and having an opposite end thereof extended outward to form a pin portion, so that air is allowed to flow between the connecting portion and the pin portion, the connecting portion being configured to receive a Presta valve, and the pin portion being configured to press against a Schrader valve, the pushing member being placed at one end of the elastic sleeve so as to be contained in the head housing and located inside the cam section; and an end cap having a round cap body, the cap body being centrally formed with an opening and peripherally provided with a circular cap wall, the end cap having the cap wall screwed to the opening segment of the head housing so that the cap body presses against and positions the elastic sleeve, with the opening communicated with the cylindrical hole of the elastic sleeve.

In operation, a user may mount the sleeve in the head housing around an air valve of an article to be inflated, and then hold the head housing in use his/her one hand while twisting the grip portion with the other hand, so that the cam section is turned from a released state where the second end wall is not in contact with the pushing member to an engaged state where the first end wall presses against the pushing member. At this time, the pushing member is pressed to push and deform the elastic sleeve, thereby engaging the air valve of the article to be inflated firmly.

BRIEF DESCRIPTION OF THE SEVERAL VIEWS OF THE DRAWINGS

FIG. 2 is a font view of the air pump of FIG. 1.

FIG. 3 is a top view of the air pump of FIG. 1.

FIG. 6 is a cross-sectional view of the air pump taken along Line 6-6 of FIG. 3.

FIG. 7, similar to FIG. 5, shows the air pump in its engaged state.

DETAILED DESCRIPTION OF THE INVENTION

Figure 1:
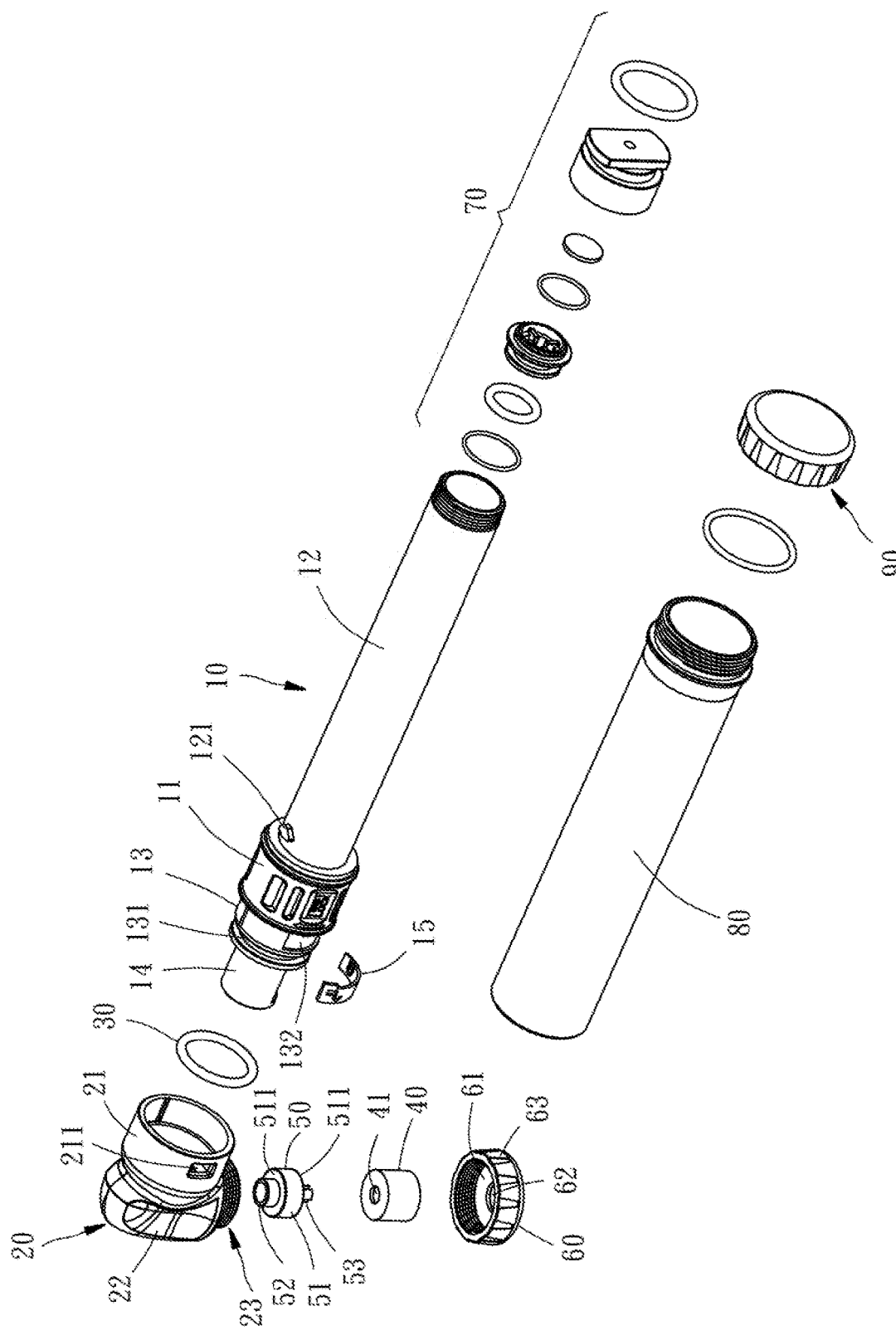
FIG. 1 is an exploded view of an air pump according to one embodiment of the present invention.
Figure 4:
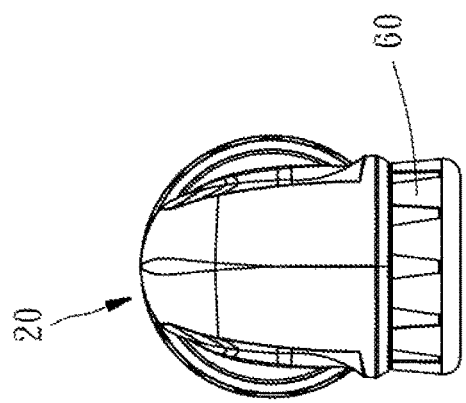
FIG. 4 is a side view of the air pump of FIG. 1.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Referring to the drawings, an air pump according to the present invention is shown to comprise the component parts described hereinafter.

Figure 10:
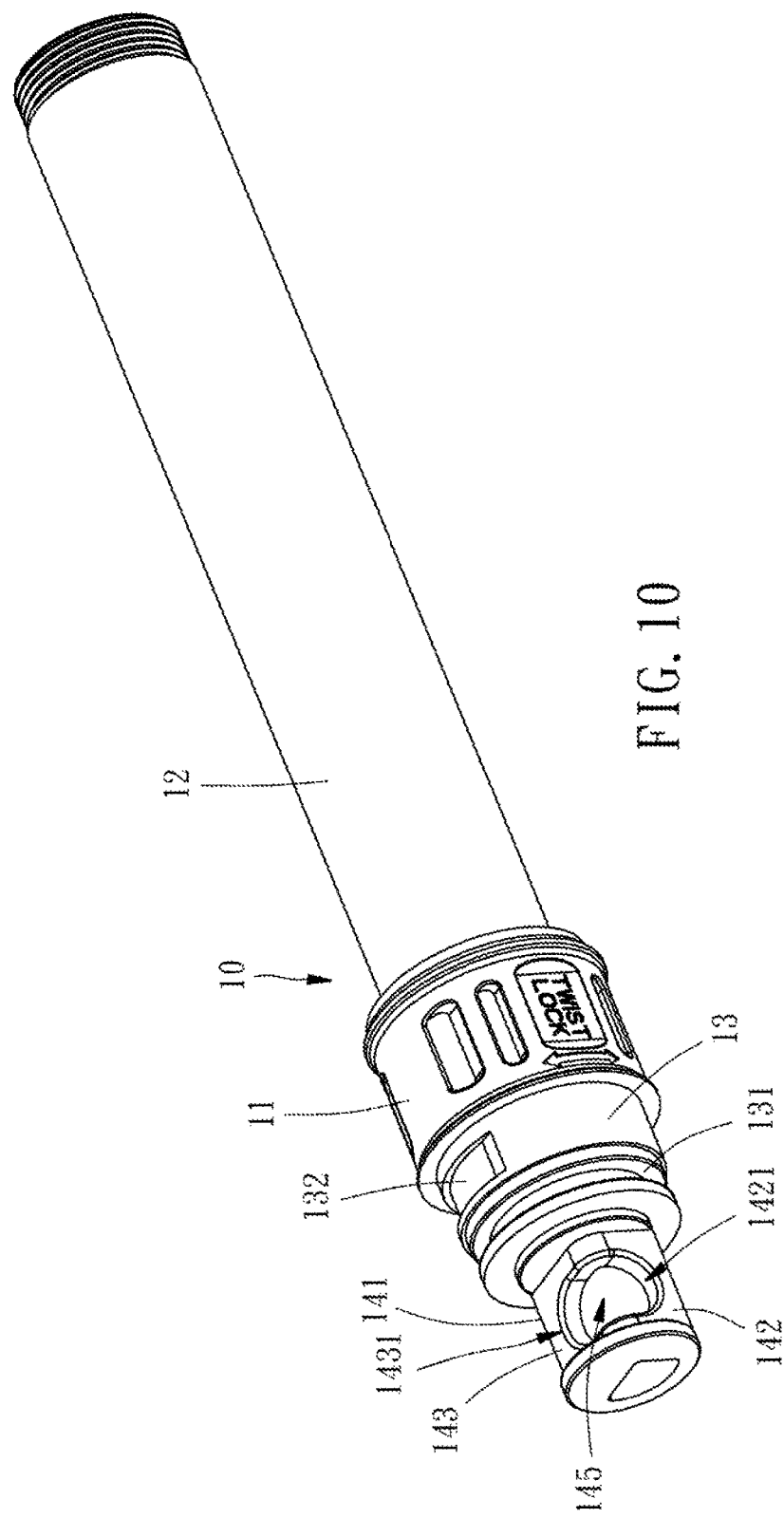
FIG. 10 is a perspective view of the body housing of the air pump of FIG. 1.
Figure 11:
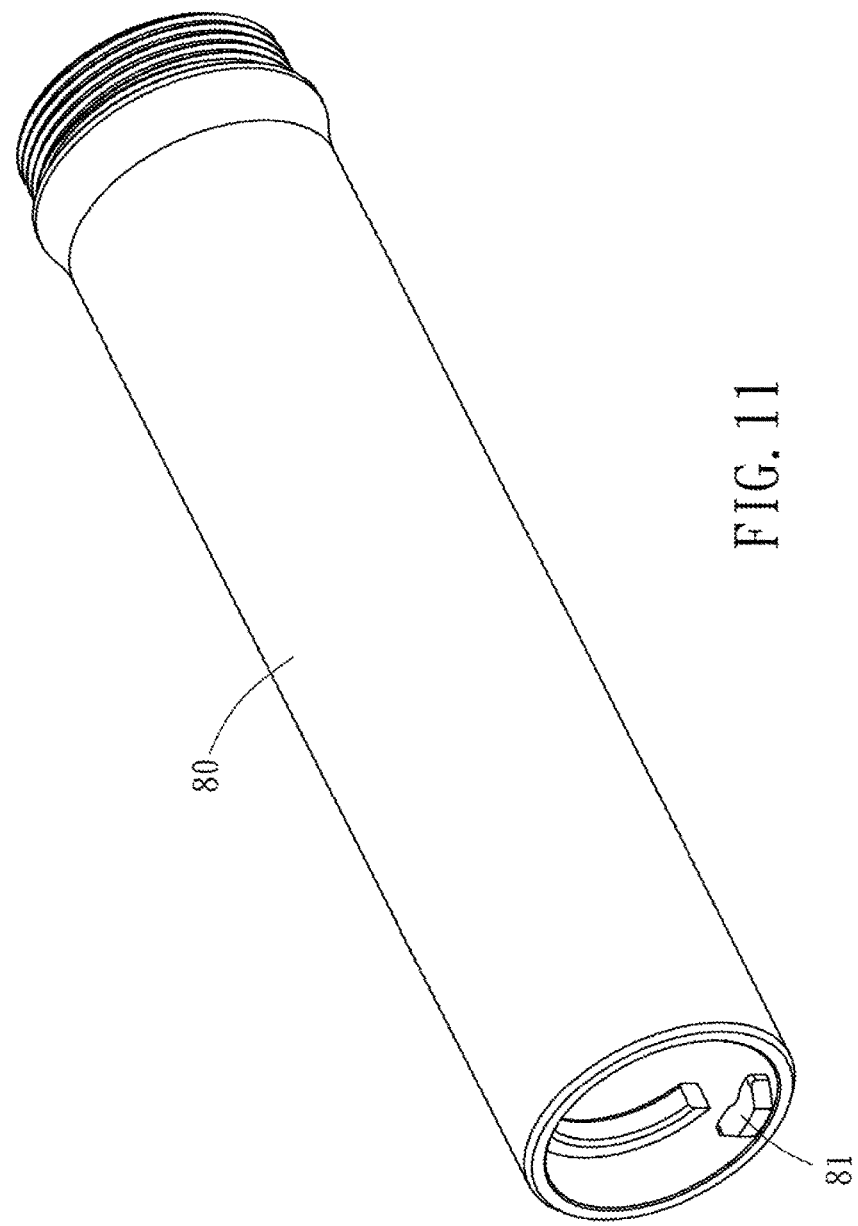
FIG. 11 is a perspective view of the handle of the air pump of FIG. 1.

A body housing (10) has a grip portion (11). The grip portion (11) has its one end connected to a barrel (12) of the air pump and has its opposite end provided with a diametrically-reduced, cylindrical coupling portion (13). A diametrically-reduced cam section (14) is extended outward from an outer end of the coupling portion (13). The cam section (14) has a curved wall (141) bent at a right angle and two substantially flat end walls (142)(143). The two end walls (142)(143) are perpendicularly connected to each other at one side and have their opposite side connected to two sides of the curved wall (141), respectively, so as to form the cam section (14) as a tube having a quarter-round section, with a channel (145) therein communicated with the coupling portion (13). The two end walls (142)(143) have different distances from a central axis of the curved wall (141). The one farther from the central axis is referred to as the first end wall (142) and has a slot-like first notch (1421), while the one closer to the central axis is referred to as the second end wall (143) and has a slot-like second notch (1431). The first notch (1421) and the second notch (1431) are communicated with each other (as shown in FIG. 10).

A head housing (20) has a tubular coupling portion (21). The coupling portion (21) has one end extended outward to form a head segment (22). The head segment (22) further extends to form an opening segment (23). The opening segment (23) and the coupling portion (21) are perpendicularly connected. The head housing (20) is at its coupling portion (21) coupled to the coupling portion (13) of the body housing (10) so that the head housing (20) and the body housing (10) are rotatable with respect to each other.

A round leakproof ring (30) is received in a circular groove (131) formed around the coupling portion (13) of the body housing (10) for forming airtight connection between the head housing (20) and the body housing (10).

An elastic sleeve (40) is provided at the opening segment (23) of the head housing (20).

A pushing member (50) has a shoulder portion (51). The shoulder portion (51) has its one end extended outward to form a tubular connecting portion (52) and has its opposite end extended outward to form a pin portion (53). Air is allowed to flow between the connecting portion (52) and the pin portion (53). The connecting portion (52) is configured to receive a Presta valve, and the pin portion (53) is configured to press against a Schrader valve. The pushing member (50) is placed at one end of the elastic sleeve (40) so as to be contained in the head housing (20) and located inside the channel (145) of the cam section (14) of the body housing (10). The shoulder top (511) of the shoulder portion (51) contacts the first end wall (142) or the second end wall (143) of the cam section (14), and the connecting portion (52) or the pin portion (53) protrudes into the channel (145) of the cam section (14). In the depicted embodiment, the connecting portion (52) protrudes into the channel (145).

An end cap (60) has a round cap body (61). The cap body (61) is centrally formed with an opening (62). The cap body (61) is peripherally provided with a circular cap wall (63). The end cap (60) has the cap wall (63) screwed to the opening segment (23) of the head housing (20) so that the cap body (61) presses against and positions the elastic sleeve (40), with the opening (62) communicated with the cylindrical hole (41) of the elastic sleeve (40).

Additionally, for a user's convenient recognition of the state of the cam section (14), a recess (132) is formed on the coupling portion (13) of the body housing (10) and located between the leakproof ring (30) and the grip portion (11) for receiving a mark plate (15) while a through hole working as a window (211) is formed on the coupling portion (21) of the head housing (20) and aligned with the mark plate (15), so that the user can see the mark plate (15) through the window (211).

The barrel (12) is formed integratedly with and extended from one end of the grip portion (11) of the body housing (10). The barrel (12) has its outer end provided with a leakproof piston (70) that allows one-way air feed. A handle (80) of a tubular shape is mounted around the barrel (12), with its body engaged with the leakproof piston (70). The handle (80) has its outer end covered by a leakproof end cap (90).

The barrel (12) has a raised retaining portion (121) that is close to the grip portion (11), and the handle (80) has a retaining portion (81) formed on its inner end wall for retaining and engaging the retaining portion (121) of the barrel (12) so as to position the handle (80) with respect to the barrel (12) and maintain the air pump at its retracted state for easy storage.

Figure 5:
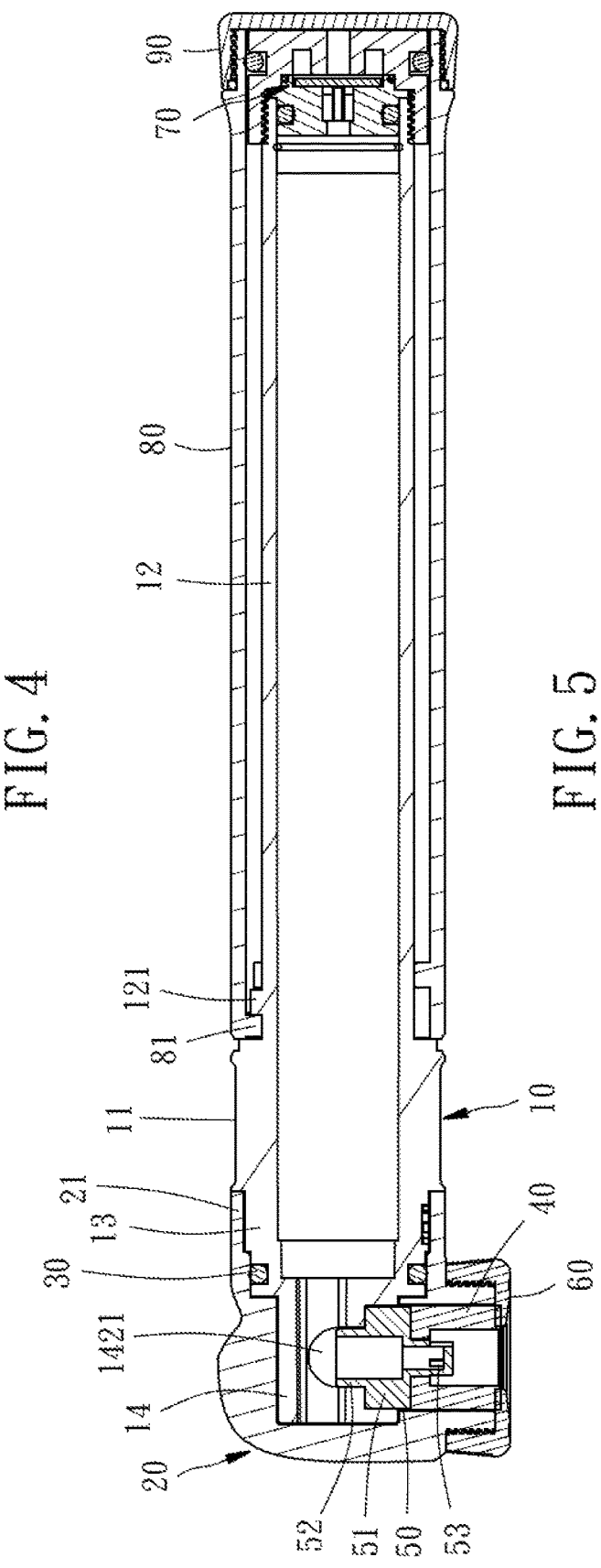
FIG. 5 is a cross-sectional view of the air pump taken along Line 5-5 of FIG. 3.
Figure 8:
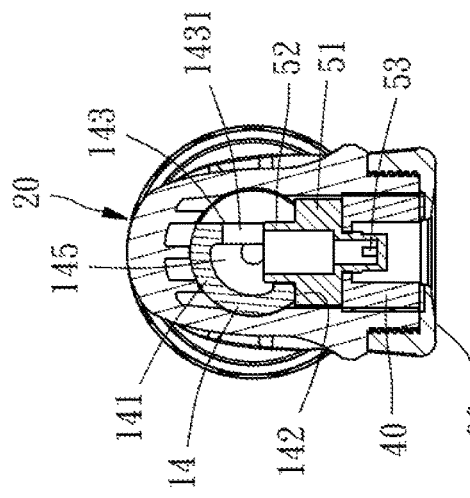
FIG. 8, similar to FIG. 6, shows the air pump in its engaged state.
Figure 9:
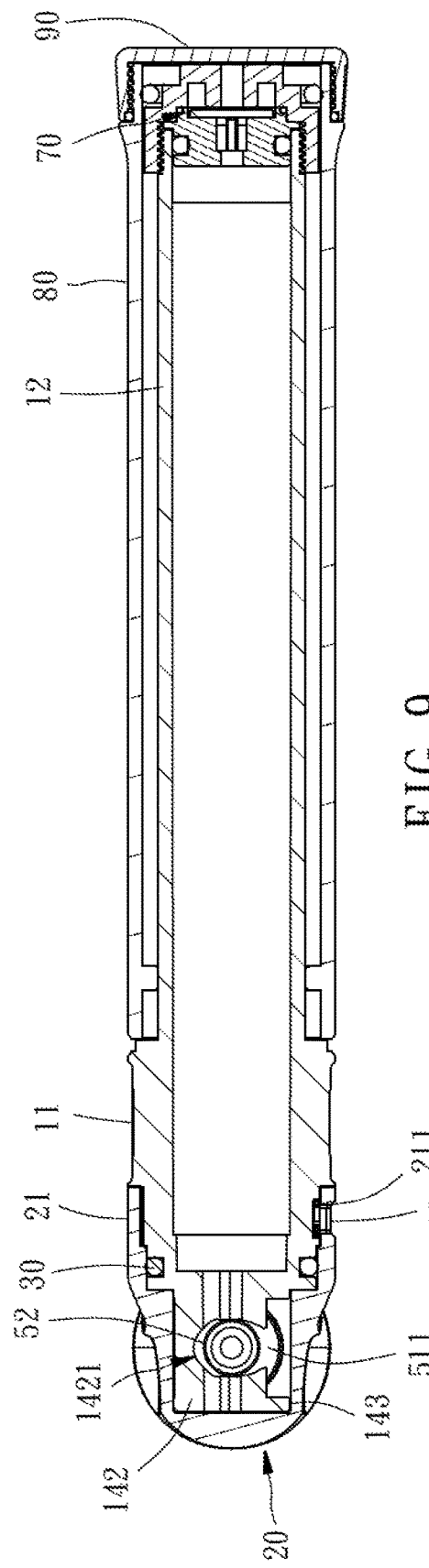
FIG. 9 is a cross-sectional view of the air pump taken along Line 9-9 of FIG. 7.

In use, a user may mount the sleeve (40) of the head housing (20) around an air valve of an article to be inflated, and hold the head housing (20) in his/her one hand while twisting the grip portion (11) with the other hand, so that the cam section (14) is turned from a released state where the second end wall (143) contacts the shoulder top (511) of the pushing member (50) (as shown in FIGS. 5 and 6) to an engaged state where the first end wall (142) contacts the shoulder top (511) of the pushing member (50) (as shown in FIGS. 7, 8 and 9). At this time, the pushing member (50) is pressed by the cam section (14) to push and deform the elastic sleeve (40), thereby engaging the air valve of the article to be inflated.

The pushing member (50) may selectively have the connecting portion (52) facing the elastic sleeve (40) to engage a Presta valve, or have the pin portion (53) facing the elastic sleeve (40) to engage a Schrader valve. The latter case is shown in the present embodiment.

The present invention contributes to structural simplicity, where the airtightness between the head housing (20) and the body housing (10) is achieved by a single leakproof ring (30), and the positioning of the head housing (20) with respect to the body housing (10) is ensured by placing the pushing member (50) between the head housing (20) and the cam section (14) of the body housing (10). Furthermore, since the components are assembled and secured without using additional fixing parts, the assembling work is effort-saving and time-saving. During its twisting switch, the disclosed air pump provides clear operational feeling. In particular, once a 90-degree turn is made, the components are naturally held in position. The indication made by the window (211) and the mark plate (15) further adds operational convenience. In the present invention, the cam section (14) is hollowed to have its channel (145) receiving the pushing member (50) partially, thereby effectively compacting the structure. At last, since the channel (145) of the cam section (14) is directly communicated with the pushing member (50), the through hole is prevented from blockage.

What is claimed is:

1. An air pump capable of twist-locking engagement, comprising:
    a body housing having a grip portion, the grip portion having one end of the grip portion connected to a barrel of the air pump and having an opposite end of the grip portion provided with a diametrically-reduced, cylindrical coupling portion, a diametrically-reduced cam section being extended outward from an outer end of the coupling portion, the cam section having a curved wall bent at a right angle and two substantially flat end walls, the two end walls being perpendicularly connected to each other at one side and having their opposite side connected to two sides of the curved wall, respectively, so as to form the cam section as a tube having a quarter round section, the cam section having a channel communicated with the coupling portion, the two end walls having different distances from a central axis of the curved wall, wherein a first end wall of the two end walls is farther from the central axis and has a elongated first notch, while a second end wall of the two end walls closer to the central axis and has a elongated second notch, the first notch and the second notch being communicated with each other;

a head housing having a tubular coupling portion, the tubular coupling portion of the head housing having one end extended outward to form a head segment, the head segment further extending to form an opening segment, the opening segment and the tubular coupling portion of the head housing being perpendicularly connected, the head housing being coupled via the tubular coupling portion of the head housing to the coupling portion of the body housing so that the head housing and the body housing are rotatable with respect to each other;

a round leakproof ring being mounted around the coupling portion of the body housing for forming airtight connection between the head housing and the body housing;

an elastic sleeve being provided at the opening segment of the head housing;

a pushing member having a shoulder portion, the shoulder portion having one end of the shoulder portion extended outward to form a tubular connecting portion and having an opposite end of the shoulder portion extended outward to form a pin portion, so that air is allowed to flow between the connecting portion and the pin portion, the connecting portion being configured to receive a Presta valve, and the pin portion being configured to press against a Schrader valve, the pushing member being placed at one end of the elastic sleeve so as to be contained in the head housing and located inside the cam section; and an end cap having a round cap body, the cap body being centrally formed with an opening and peripherally provided with a circular cap wall, the end cap having the cap wall screwed to the opening segment of the head housing so that the cap body presses against and positions the elastic sleeve, with the opening communicated with the cylindrical hole of the elastic sleeve.

2. The air pump of claim 1, wherein a recess is formed on the coupling portion of the body housing and located between the leakproof ring and the grip portion for receiving a mark plate while a through hole working as a window is formed on the coupling portion of the head housing and aligned with the mark plate.

3. The air pump of claim 2, wherein the barrel is extended from one end of the grip portion of the body housing and has an outer end of the barrel provided with a leakproof piston that allows one-way air feed, in which a handle of a tubular shape is mounted around the barrel and engaged with the leakproof piston and has an outer end of the handle covered by a leakproof end cap.

4. The air pump of claim 3, wherein the barrel has a raised retaining portion that is close to the grip portion, and the handle has a retaining portion formed on an inner end wall for retaining and engaging the retaining portion of the barrel so as to position the handle with respect to the barrel.

5. The air pump of claim 1, wherein the barrel is extended from one end of the grip portion of the body housing and has an outer end of the barrel provided with a leakproof piston that allows one-way air feed, in which a handle of a tubular shape is mounted around the barrel and engaged with the leakproof piston and has an outer end of the handle covered by a leakproof end cap.

6. The air pump of claim 5, wherein the barrel has a raised retaining portion that is close to the grip portion, and the handle has a retaining portion formed on an inner end wall for retaining and engaging the retaining portion of the barrel so as to position the handle with respect to the barrel.

* * * * *